US012298957B1

(12) United States Patent
Banerjee et al.

(10) Patent No.: US 12,298,957 B1
(45) Date of Patent: May 13, 2025

(54) SYSTEMS AND METHODS FOR MAPPING COLUMNS ACROSS DATABASES

(71) Applicant: EYGS LLP, London (GB)

(72) Inventors: Arindam Banerjee, Howrah (IN); Sanghamitra Gopen Pramanik, Kolkata (IN)

(*) Notice: Subject to any disclaimer, the term of this patent is extended or adjusted under 35 U.S.C. 154(b) by 0 days.

(21) Appl. No.: 18/953,584

(22) Filed: Nov. 20, 2024

(51) Int. Cl.
*G06F 16/22* (2019.01)
*G06F 16/901* (2019.01)

(52) U.S. Cl.
CPC ........ *G06F 16/2282* (2019.01); *G06F 16/221* (2019.01); *G06F 16/9024* (2019.01)

(58) Field of Classification Search
CPC ............... G06F 16/2282; G06F 16/221; G06F 16/9024
See application file for complete search history.

(56) References Cited

U.S. PATENT DOCUMENTS

| | | | |
|---|---|---|---|
| 7,406,456 B2* | 7/2008 | Calistri-Yeh | G06F 16/36 706/45 |
| 9,104,707 B1* | 8/2015 | Allen | G06F 16/316 |
| 9,529,830 B1* | 12/2016 | Eshwar | G06F 16/334 |
| 9,928,281 B2 | 3/2018 | Bourbonnais et al. | |
| 10,061,801 B2* | 8/2018 | Challapalli | G06F 16/2445 |
| 10,380,115 B2* | 8/2019 | Dutta | G06F 16/24553 |
| 12,204,578 B2* | 1/2025 | Wan | G06F 16/367 |
| 2020/0081899 A1 | 3/2020 | Shapur | |
| 2021/0158176 A1* | 5/2021 | Wan | G06F 18/22 |
| 2024/0193191 A1* | 6/2024 | Sawarkar | G06N 20/00 |

OTHER PUBLICATIONS

Collibra, "Collibra Data Quality & Observability demo: source to target verification," Collibra Data Intelligence Platform Video, Sep. 2024, 11 pages, retrieved at url: https://www.collibra.com/us/en/resources/source-to-target-verification.
IBM, "How source columns map to target columns (undirectional replication)," IBM InfoSphere Data Replication, Jan. 30, 2024, 2 pages.
IBM, "Mapping source and target cols. automatically," Infosphere Data Replication, Oct. 9, 2024, 2 pages. Retrieved online: https://www.ibm.com/docs/en/idr/11.3.3?topic=columns-mapping-source-target-automatically.

(Continued)

*Primary Examiner* — Jorge A Casanova
(74) *Attorney, Agent, or Firm* — COOLEY LLP

(57) ABSTRACT

According to an embodiment, a non-transitory, processor-readable medium storing instructions that, when executed by a processor, cause the processor to cause display of (1) a first node associated with a name of a column of a first table, (2) a second node associated with a name of a column of a second table, and (3) a third node associated with a name of a column of a third table. A user-defined selection of the second node and not the third node is received via a graphical user interface (GUI). A request to store, at a first memory location, input data associated with the column of the first table is received and based on the user-defined selection and in response to receiving the request, the input data is stored at a second memory location associated with the column of the second table.

17 Claims, 11 Drawing Sheets

(56) References Cited

OTHER PUBLICATIONS

Informatica Documentation, "Mapping Source and Target Tables Individually," Informatica Data Replication User Guide, V. 9.8.0, Dec. 7, 2018, pp. 213-214, 3 pages. Retrieved online: url:https://docs.informatica.com/data-replication/data-replication/9-8-0/user-guide/creating-replication-configurations/mapping-source-and-target-tables/mapping-source-and-target-tables-individually.html.
Qlik Talend, "Defining a query mapping," Talend Data Catalog User Guide V.8.0, Apr. 2024, 1 page, retreived at url: https://help.qlik.com/talend/en-us/data-catalog-user-guide/8.0/defining-query-mapping.
Sheetrit et al., "ReMatch: Retrieval Enhanced Schema Matching with LLMs," arXiv preprint arXiv:2403.01567, Mar. 3, 2024, 5 pages.
Stardog, "Virtual Graph Mappings: Learn how to unify relational data in Stardog at query time," Stardog Data Management Platform, first publication date unknown. Retrieved from https://docs.stardog.com/tutorials/virtual-graph-mappings#mapping-to-nodes, [retrieved on Jan. 29, 2025]; 5 pages.

\* cited by examiner

800

Receive (1) first column name data associated with a first column, (2) second column name data associated with a second column, and (3) not remaining data from the first column and the second column
802

Provide (1) the first column name data as input to a machine learning model to produce a first semantic vector and (2) the second column name data as input to the machine learning model to produce a second semantic vector
804

Add (1) the first column name data to a first node of a graph data structure and (2) the second column name data to a second node of the graph data structure
806

Generate a first edge between the first node and the second node, the first edge having a first weight that is determined based on a distance metric between the first semantic vector and the second semantic vector
808

Cause display, via a graphical user interface (GUI) executed at a compute device, of (1) the first node, (2) the second node, (3) the first edge, (4) a third node associated with third column name data that is different from the first column name data, and (5) a second edge between the first node and the third node
810

900 

```
┌─────────────────────────────────────────────────────────────────────┐
│ Receive (1) column data that is (a) associated with a column of a    │
│ first table and (b) not associated with a column of a second table   │
│ and (2) first column name data associated with the column of the     │
│ first table                                                          │
│                              902                                     │
└─────────────────────────────────────────────────────────────────────┘
                                  │
                                  ▼
┌─────────────────────────────────────────────────────────────────────┐
│ Identify a column of a second table (1) based on (a) the first       │
│ column name data, (b) column name data associated with the column    │
│ of the second table, and (c) a map between the column of the first   │
│ table and the column of the second table, and (2) without accessing  │
│ the column data                                                      │
│                              904                                     │
└─────────────────────────────────────────────────────────────────────┘
```

Cause display of (1) a first node associated with a name of a column of a first table, (2) a second node associated with a name of a column of a second table, and (3) a third node associated with a name of a column of a third table
1002

Receive, via a graphical user interface (GUI), a user-defined selection of the second node and not the third node
1004

Receive a request to store, at a first memory location, input data associated with the column of the first table
1006

Based on the user-defined selection and in response to receiving the request, automatically cause the input data to be stored at a second memory location associated with the column of the second table
1008

FIG. 10

SYSTEMS AND METHODS FOR MAPPING COLUMNS ACROSS DATABASES

FIELD

One or more embodiments described herein relate to systems and computerized methods for mapping columns across databases based on column name data and without accessing column data.

BACKGROUND

Some known techniques to discover and integrate datasets (referred to herein as "mapping") include searching disparate data sources through schema matching, where exact matching pairs of columns are identified between a source schema and a target schema. Significant variety between data sources, however, causes such known techniques to overlook associated (but not equivalent) columns. Some other known techniques map tables and columns based on table and column names, without analyzing data stored within the tables or columns. These known techniques embed the table and column names using machine learning models, such as transformer-based models or large language models (LLMs), to produce semantic vectors that can be compared based on a metric, such as a cosine distance. At least some of these machine learning models, however, are general purpose models that are trained to infer the generic meaning of common words, and not of domain-specific words, while generating semantic vectors. While some known machine learning models can be trained based on domain-specific training data to perform narrower inferencing tasks, such known machine learning models cannot be deployed across disparate database systems that have different naming conventions.

Therefore, a need exists for systems and methods configured to improve domain-specific column mapping.

SUMMARY

According to an embodiment, a non-transitory, processor-readable medium stores instructions that, when executed by a processor, cause the processor to receive (1) first column name data associated with a first column, (2) second column name data associated with a second column, and (3) not remaining data from the first column and the second column, the first column name data being associated with a first table, and the second column name data being associated with a second table that is different from the first table. The first column name data is provided as input to a machine learning model to produce a first semantic vector, and the second column name data is provided as input to the machine learning model to produce a second semantic vector. The first column name data is added to a first node of a graph data structure, and the second column name data is added to a second node of the graph data structure. A first edge is generated between the first node and the second node, the first edge having a first weight that is determined based on a distance metric between the first semantic vector and the second semantic vector. The instructions also cause the processor to cause display, via a graphical user interface (GUI) executed at a compute device, of (1) the first node, (2) the second node, (3) the first edge, (4) a third node associated with third column name data that is different from the first column name data, and (5) a second edge between the first node and the third node, the second edge having a second weight that is determined based on the first semantic vector and a third semantic vector associated with the third node. A user input is received, via the GUI, that indicates a selection of the second node and not the third node, and the first weight is increased based on the user input to produce an increased weight of the first edge. The second weight is decreased based on the user input to produce a decreased weight of the second edge. A link is defined between a fourth column of a third table and a fifth column of a fourth table (1) based on the increased weight of the first edge and the decreased weight of the second edge and (2) without accessing column data stored in the fourth column and the fifth column, the third table and the fourth table each being different than the first table and the second table.

According to an embodiment, a non-transitory, processor-readable medium stores instructions that, when executed by a processor, cause the processor to receive column data that is (a) associated with a column of a first table and (b) not associated with a column of a second table. The instructions further cause the processor to receive first column name data associated with the column of the first table. A column of a second table is identified (1) based on (a) the first column name data, (b) second column name data associated with the column of the second table, and (c) a map between the column of the first table and the column of the second table. The column of the second table is identified without accessing the column data. The map is generated based on a graph that includes (1) a first node that is associated with the first column name data, (2) a second node that is associated with the second column name data, and (3) an edge between the first node and the second node. The edge has an initial weight value that is determined based on (a) a first semantic vector associated with the first column name data and (b) a second semantic vector associated with the second column name data. The map is generated based further on a user-defined selection of the second node that causes the initial weight value to be greater than a predefined threshold. In response to identifying the column of the second table, the column data is stored in the column of the second table.

According to an embodiment, a non-transitory, processor-readable medium storing instructions that, when executed by a processor, cause the processor to cause display of (1) a first node associated with a name of a column of a first table, (2) a second node associated with a name of a column of a second table, and (3) a third node associated with a name of a column of a third table. A user-defined selection of the second node and not the third node is received via a graphical user interface (GUI). A request to store, at a first memory location, input data associated with the column of the first table is received and based on the user-defined selection and in response to receiving the request, the input data is stored at a second memory location associated with the column of the second table.

BRIEF DESCRIPTION OF THE DRAWINGS

FIGS. 8A-B show flow diagrams illustrating a method implemented by a column mapper application to determine a link between columns of tables, according to an embodiment.

FIG. 9 shows a flow diagram illustrating a method implemented by a column mapper application to identify a column based on column name data and without accessing column data.

FIG. 10 shows a flow diagram illustrating a method implemented by a column mapper application to automatically cause input data to be stored at a memory location.

DETAILED DESCRIPTION

At least some column mapper applications described herein are configured to map columns across a plurality of tables based on column and/or table name data and user feedback. Mapped columns can be indicated/represented by a data structure, such as a graph, table, array, and/or the like. A representation of the data structure can be displayed to a user (e.g., having domain knowledge) for feedback (e.g., acceptance, rejection, modification, etc.), and in some instances, a column mapper application can exclude an indication of a mapped column pair based on a confidence metric being below a threshold value. The column mapper application can further map columns without causing display of an indication of the mapped column pair and/or receiving user feedback if, for example, the mapped column pair has a confidence metric above a threshold value and/or at least a predefined number of user acceptances have been received. Alternatively or in addition, in some implementations, a column mapper application can adaptively preserve an indication of a mapped column pair in response to a first user rejecting that mapped column pair, such that a second user (e.g., from an organization that excludes the first user) can accept or reject the mapped column pair.

Figure 1:
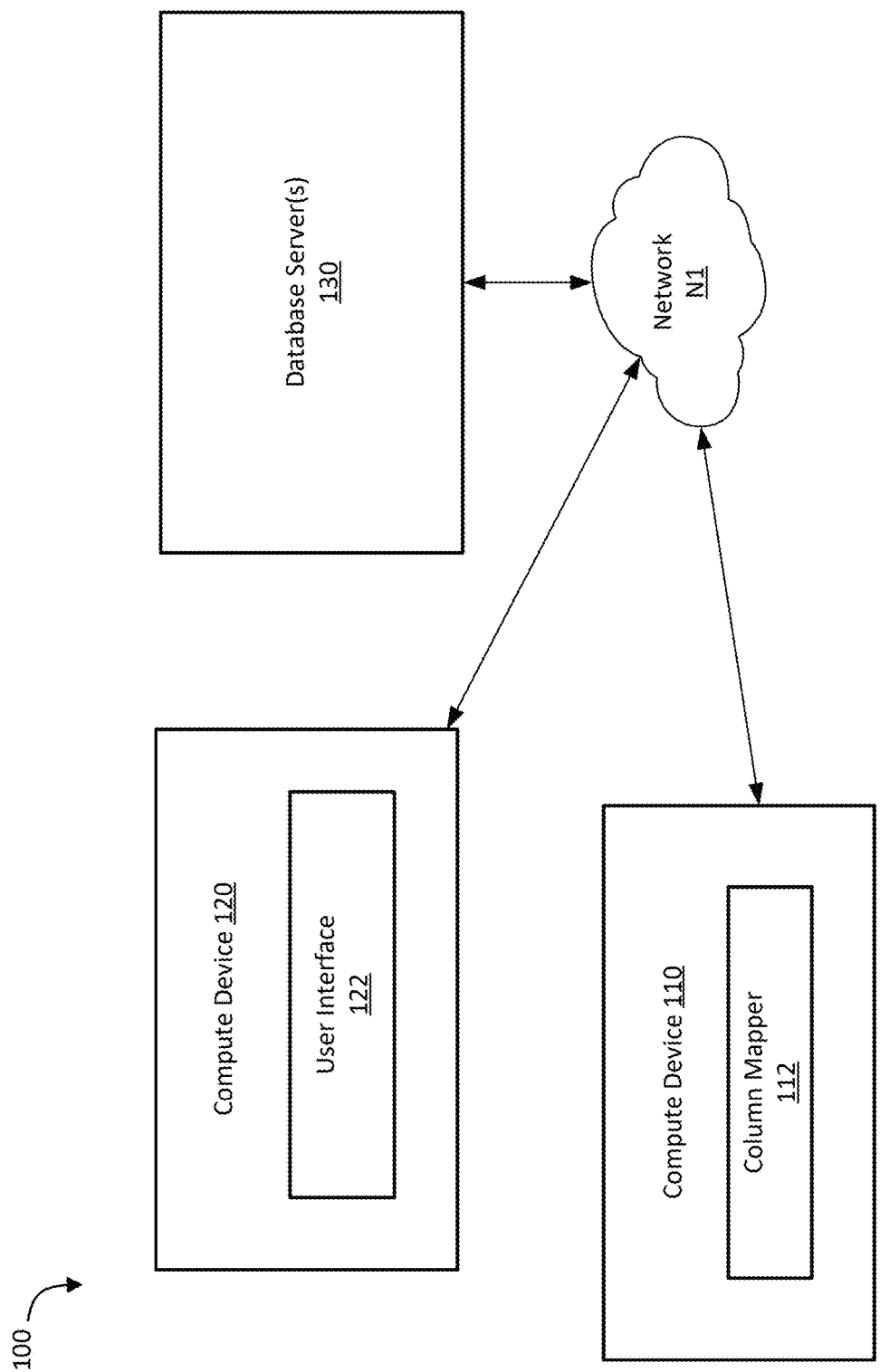
FIG. 1 shows a system block diagram of a column mapper system, according to an embodiment.

FIG. 1 shows a system block diagram of a column mapper system 100, according to an embodiment. The column mapper system 100 includes a compute device 110, a compute device 120, a database server(s) 130, and a network N1. The column mapper system 100 can include alternative configurations, and various steps and/or functions of the processes described below can be shared among the various devices of the column mapper system 100 or can be assigned to specific devices (e.g., the compute device 110, the compute device 120, and/or the like). For example, in some configurations, a user can provide inputs directly to the compute device 110 rather than via the compute device 120, as described herein.

In some embodiments, the compute device 110, the compute device 120, and/or the database server(s) 130 can include any suitable hardware-based computing devices and/or multimedia devices, such as, for example, a server, a desktop compute device, a smartphone, a tablet, a wearable device, a laptop and/or the like. In some implementations, the compute device 110, the compute device 120, and/or the database server(s) 130 can be implemented at an edge (e.g., with respect to the network N1) node or other remote (e.g., with respect to the network N1) computing facility and/or device. In some implementations, each of the compute device 110, the compute device 120, and/or the database server(s) 130 can be (or be included in) a data center or other control facility and/or device configured to run and/or execute a distributed computing system and can communicate with other compute devices.

The compute device 110 can include a column mapper application 112, which can include software (1) stored at a memory that functionally and/or structurally similar to the memory 210 of FIG. 2 discussed below and (2) executed via a processor that is functionally and/or structurally similar to the processor 220 of FIG. 2 discussed below. The column mapper application 112 can be configured to map columns from different databases (e.g., that are implemented by the database server(s) 130) based on column name data, as described further herein.

The compute device 120 can implement a user interface 122, which can include a graphical user interface (GUI) (e.g., displayed on a monitor/display) that is configured to receive input data (e.g., an indication of a source and/or target database(s), access credentials and/or an indication of a subject (e.g., finance, human resources, engineering, and/or any other field that can define a relevant subset of data, as described further herein) from a user. The user interface 122 can further cause display of output data generated by the column mapper application 112 (e.g., a portion of a graph having a source node, a plurality of target nodes, and edges having edge weights between the source node and the plurality of target nodes). The column mapper application 112 can be implemented via software and/or hardware.

The database server(s) 130 can implement a database, which can include a collection of data configured for retrieval and storage. More specifically, the database server(s) can execute database management software such as, for example, MySQL, PostgreSQL®, MongoDB®, and/or the like. A database can include at least one table having at least one column.

The compute device 110 can be networked and/or communicatively coupled to the compute device 120 and/or the database server(s) 130, via the network N1, using wired connections and/or wireless connections. The network N1 can include various configurations and protocols, including, for example, short range communication protocols, Bluetooth®, Bluetooth® LE, the Internet, World Wide Web, intranets, virtual private networks, wide area networks, local networks, private networks using communication protocols proprietary to one or more companies, Ethernet, WiFi® and/or Hypertext Transfer Protocol (HTTP), cellular data networks, satellite networks, free space optical networks and/or various combinations of the foregoing. Such communication can be facilitated by any device capable of transmitting data to and from other compute devices, such as a modem(s) and/or a wireless interface(s).

In some implementations, although not shown in FIG. 1, the column mapper system 100 can include multiple compute devices 110, compute devices 120, and/or database servers 130. For example, in some implementations, the column mapper system 100 can include a plurality of compute devices 110, where each compute device 110 can be associated with a different user from a plurality of users. In some implementations, a plurality of compute devices 110 can be associated with a single user, where each compute device 110 can be associated with, for example, a different input modality (e.g., text input, audio input, video input, etc.). Some implementations can include various combinations of the above.

Figure 2:
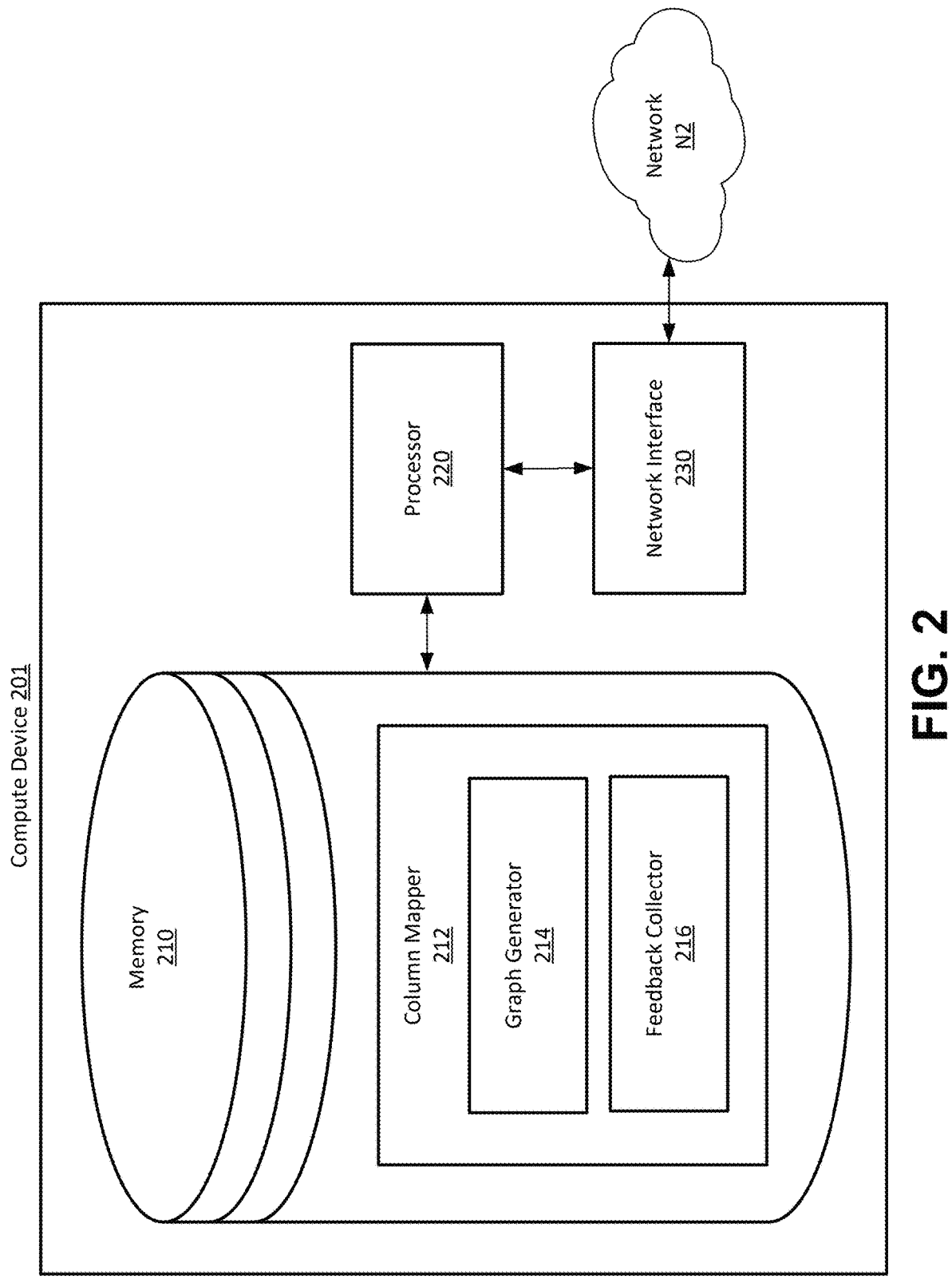
FIG. 2 shows a system block diagram of a compute device included in a column mapper system, according to an embodiment.

FIG. 2 shows a system block diagram of a compute device 201 included in a column mapper system, according to an embodiment. The compute device 201 can be structurally and/or functionally similar to, for example, the compute device 110 and/or 120 and/or the database server(s) 130 of the column mapper system 100 shown in FIG. 1. The compute device 201 can be a hardware-based computing device, a multimedia device, or a cloud-based device such as, for example, a computer device, a server, a desktop compute device, a laptop, a smartphone, a tablet, a wearable device, a remote computing infrastructure, and/or the like. The compute device 201 includes a memory 210, a processor 220, and a network interface 230 operably coupled to a network N2.

The processor 220 can be, for example, a hardware-based integrated circuit (IC), or any other suitable processing device configured to run and/or execute a set of instructions or code (e.g., stored in memory 210). For example, the processor 220 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a graphics processing unit (GPU), a programmable logic controller (PLC), a remote cluster of one or more processors associated with a cloud-based computing infrastructure and/or the like. The processor 220 is operatively coupled to the memory 210. In some embodiments, for example, the processor 220 can be coupled to the memory 210 through a system bus (for example, address bus, data bus and/or control bus). In some implementations, the processor 220 can include a plurality of parallelly arranged processors.

The memory 210 can be, for example, a random-access memory (RAM), a memory buffer, a hard drive, a read-only memory (ROM), an erasable programmable read-only memory (EPROM), and/or the like. The memory 210 can store, for example, one or more software modules and/or code that can include instructions to cause the processor 220 to perform one or more processes, functions, and/or the like. In some implementations, the memory 210 can be a portable memory (e.g., a flash drive, a portable hard disk, and/or the like) that can be operatively coupled to the processor 220. In some instances, the memory can be remotely operatively coupled with the compute device 201, for example, via the network interface 230. For example, a remote database server can be operatively coupled to the compute device 201.

The memory 210 can store various instructions associated with processes, algorithms and/or data, as described herein. Memory 210 can further include any non-transitory computer-readable storage medium for storing data and/or software that is executable by processor 220, and/or any other medium which may be used to store information that may be accessed by processor 220 to control the operation of the compute device 201. For example, the memory 210 can store data associated with a column mapper application 212. The column mapper application 212 can be functionally and/or structurally similar to the column mapper application 112 of FIG. 1 and/or the column mapper application 312 of FIG. 3 (described herein).

Figure 3:
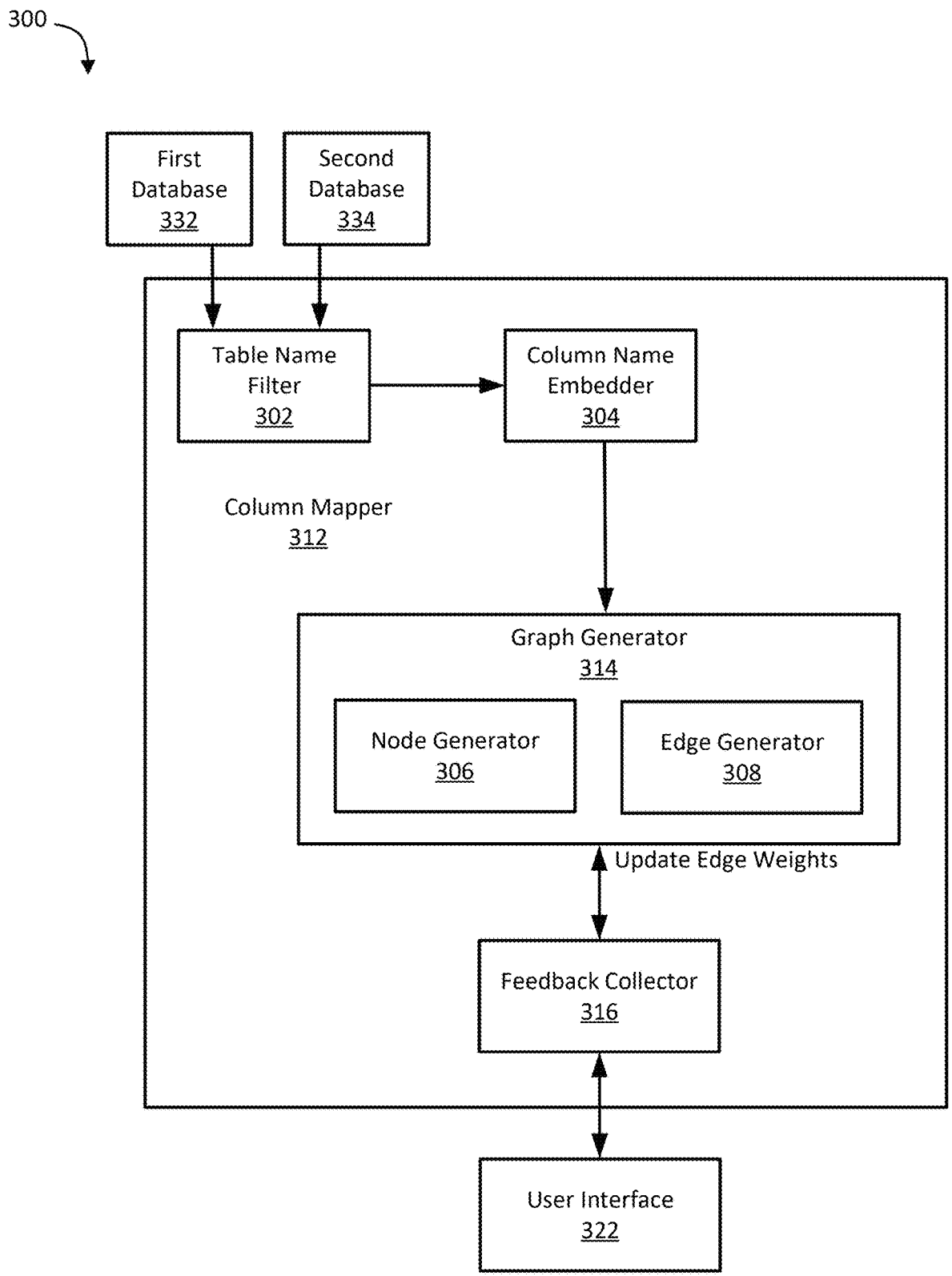
FIG. 3 shows a system block diagram of column mapper components included in a column mapper application, according to an embodiment.
Figure 4:
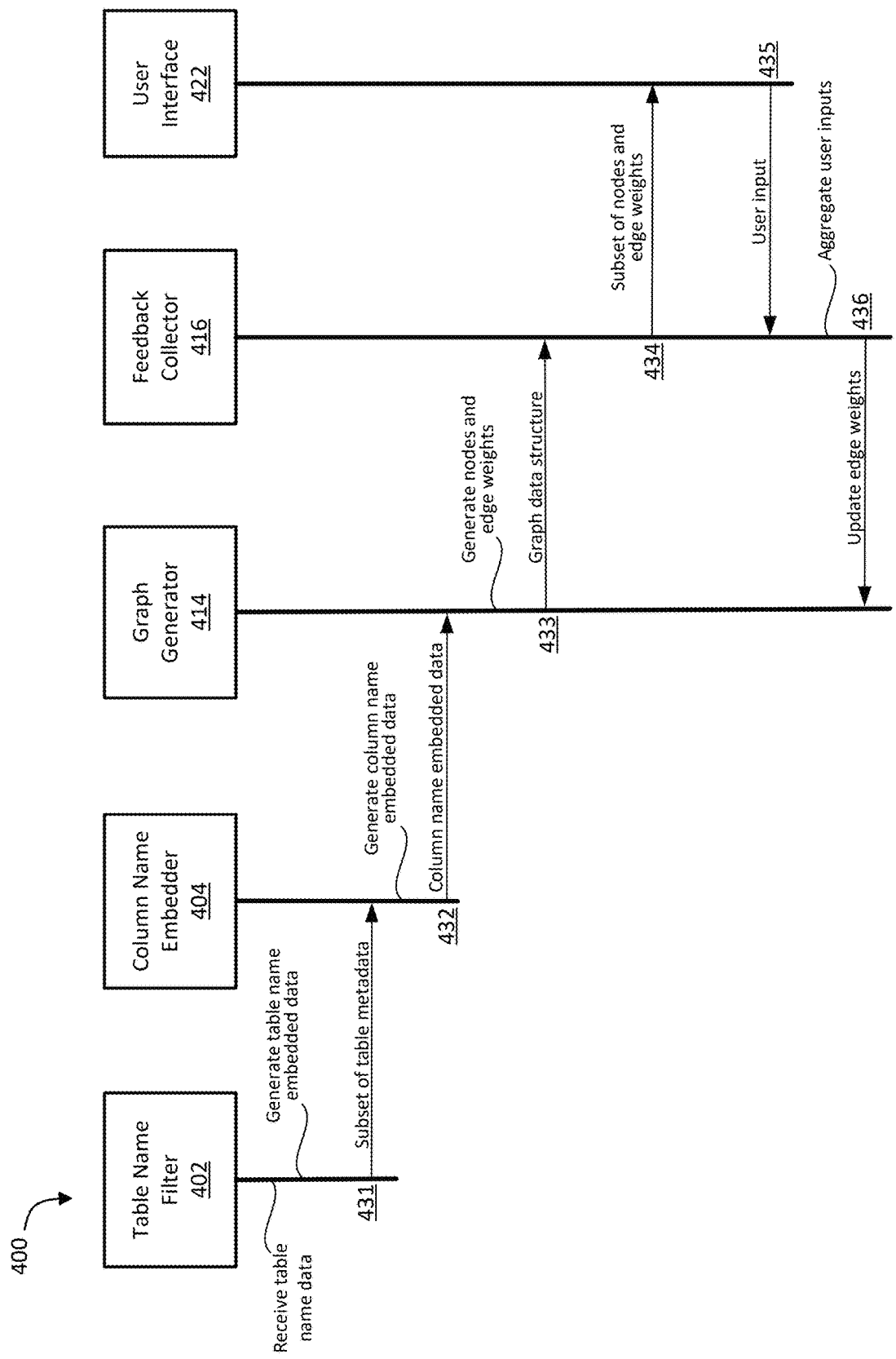
FIG. 4 shows a swim lane diagram of interactions facilitated by a column mapper application, according to an embodiment.

The column mapper application 212 includes a graph generator 214, which can be functionally and/or structurally similar to the graph generator 314 of FIG. 3 and/or the graph generator 414 of FIG. 4, each of which is described further herein. The column mapper application 212 further includes a feedback collector 216, which can be functionally and/or structurally similar to the feedback collector 316 of FIG. 3, the feedback collector 416 of FIG. 4, and/or the feedback collector 700 of FIG. 7, each of which is described further herein.

The network interface 230 can be configured to connect to the network N2, which can be functionally and/or structurally similar to the network N1 of FIG. 1. For example, network N2 can use any of the communication protocols described above with respect to network N1 of FIG. 1.

In some instances, the compute device 201 can further include a display, an input device, and/or an output interface (not shown in FIG. 2). The display can be any display device (e.g., a monitor, screen, etc.) by which the compute device 201 can output and/or display data (e.g., via a user interface that is structurally and/or functionally similar to the user interface 122 of FIG. 1). The input device can include a mouse, keyboard, touch screen, voice interface, and/or any other hand-held controller or device or interface via which a user may interact with the compute device 201. The output interface can include a bus, port, and/or other interfaces by which the compute device 201 may connect to and/or output data to other devices and/or peripherals.

FIG. 3 shows a system block diagram of column mapper components included in a column mapper application, according to an embodiment. The column mapper components 300 can be associated with a compute device (e.g., a compute device that is structurally and/or functionally similar to the compute device 201 of FIG. 2 and/or the compute devices 110 and 120 of FIG. 1). For example, the column mapper components 300 can be included in and/or associated with (1) the column mapper application 112 of FIG. 1 and/or (2) the column mapper application 212 of FIG. 2. In some instances, the column mapper components 300 can include software stored in memory 210 and configured to execute via the processor 220 of FIG. 2. In some instances, at least a portion of the column mapper components 300 can be implemented in hardware (e.g., an ASIC). The column mapper components 300 receive metadata (described herein) from a first database 332 and a second database 334 and cause display of representations of column mappings (e.g., as described at least in relation to FIGS. 6-7) via the user interface 322 (e.g., that is functionally and/or structurally similar to the user interface 122 of FIG. 1). The column mapper components 300 include a column mapper application 312 (e.g., that is functionally and/or structurally similar to the column mapper application 112 of FIG. 1 and/or the column mapper application 212 of FIG. 2). The column mapper application 312 includes a table name filter 302, a column name embedder 304, a graph generator 314 (e.g., that is functionally and/or structurally similar to the graph generator 214 of FIG. 2), and a feedback collector 316 (e.g., that is functionally and/or structurally similar to the feedback collector 216 of FIG. 2 and/or the feedback collector 700 of FIG. 7).

The column mapper application 312 can be configured to access metadata from user-defined first (e.g., source) and second (e.g., target) databases 332, 334. A user can provide indications of the first and second databases 332, 334 via the user interface 322, and these indications can be stored in a key-value store. In some instances, although not shown in FIG. 3, a user can designate a plurality of source databases and/or a plurality of target databases. Based on the indications of the designated databases, the column mapper application 312 can establish access/connection to these databases via an application programming interface (API), such as Open Database Connectivity (ODBC) and/or the like. Following establishment of connections to the first and second databases 332, 334, the column mapper application 312 can read table metadata from the information schema and/or similar tables included in the first and second databases 332, 334. The table metadata can contain, for example, table name data and/or column name data. The table name filter 302 can receive the table name data, as described further below.

The table name filter 302 can select a subset of tables from the first database 332 and/or the second database 334 based on the table name data and/or a user-defined indication of a subject. For example, a database associated with an organization can include data from different departments, such as marketing, human resources (HR), supply chain, technical, etc., and columns associated with one department may not be relevant to columns associated with another department. To reduce extraneous processing and conserve compute resources, the table name filter 302 can be configured to select a subset of tables from the first database 332 and/or the second database 334 that are relevant to the given subject.

Based on the given subject value, the table name filter 302 can generate clusters and/or communities of tables separately from the first database 332 and the second database 334. More specifically, the table name filter 302 can store the indication of the subject and table names from the table name data in a data structure (e.g., a list), and the table name filter 302 can include a machine learning model (e.g. a transformer-based model, such as a sentence transformer model, a word2vec model, etc.) that is trained to generate embedded data (e.g., a semantic vector) for values within the data structure. The table name filter 302 can determine distance metrics (e.g., cosine distances) between a semantic vector (and/or the like) associated with the subject and semantic vectors associated with the table names to generate a subset (e.g., a cluster, community, etc.) of tables that are relevant to the subject. By reducing the number of tables that are processed further (e.g., by the column name embedder 304, described below), the table name filter 302 can reduce compute resource usage (e.g., processor usage, memory usage, bandwidth usage, etc.). An illustration of example steps implemented by the table name filter 302 is shown below:

names. The column name embedder 304 can include a machine learning model (e.g. a transformer-based model, such as a sentence transformer model) that is trained to generate the embedded data based on the column names. In some implementations, the column name embedder 304 can generate a semantic vector for each column name. Alternatively or in addition, the column name embedder 304 can generate a semantic vector for each word in each column name, such that each word can be compared to other words from other column names to determine a match. As a result of having to represent single words rather than phrases of multiple words, the vector space associated with the semantic vectors can be reduced. Similarly stated, a semantic vector that represents an individual word can be smaller (e.g., can have fewer elements) than a semantic vector that represents a phrase of multiple words, since the number of semantically unique phrase can be greater than the number of semantically unique words. Smaller semantic vectors can be stored in less memory and compared to one another using fewer processing steps, improving computational efficiency.

Semantic vectors generated by the column name embedder 304 can be provided as input to the graph generator 314, which can include a node generator 306 and an edge generator 308. The graph generator 314 can generate a graph data structure that includes nodes (also referred to herein as vertices) and edges. More specifically, the node generator 306 can generate a node for each column name. Alternatively or in addition, the node generator 306 can generate a node for each word from each column name, such that semantic vectors associated with individual words from a first column (as described above) can be compared to individual words from a second column (e.g., where the first

```
Input: Table names of source and target database systems, subject value,
       a pretrained sentence transformer model
Output: Community of tables related to the given subject value
i.      final_communities := dictionary(source_tables:list( ), target_tables:list( ))
ii.     for tables in {source database system, target database system} do:
iii.        table_names := list(subject)
iv.         for table in tables do:
v.              table_names.append(table)
vi.         embeddings := model.encode(table_names)
vii.        communities := community_detection(embeddings)
viii.       for community in communities do:
ix.             if subject in community:
x.                  for table in community do:
xi.                     if table in source database systems:
xii.                        final_communities[source_tables].append(table)
xiii.                   else:
xiv.                        final_communities[target_tables].append(table)
xv.                 Break
xvi.    final_communities[source_tables] = set(final_communities[source_tables])
xvii.   final_communities[target_tables] = set(final_communities[target_tables])
xviii.  return final_communities
```

In some implementations, the table name filter 302 can be configured to split table names without spaces (e.g., "FirstName") into list words with spaces (e.g., "First Name") based on letter capitalization, symbols (e.g., underscores, hyphens, etc.), a dictionary, etc. As illustrated above (e.g., at step xvi), the table name filter 302 can convert respective lists of source and target table names (e.g., from the first database 332 and the second database 334, respectively) into sets to remove duplicate and/or redundant columns that appear in the source and/or target tables. As a result, extraneous compute steps based on duplicate and/or redundant data can be reduced.

The column names from the subset of table names identified by the table name filter 302 can be provided as input to the column name embedder 304 to produce embedded data (e.g., semantic vectors) associated with the column and second columns are associated with, respectively, the first database 332 and the second database 334). Nodes associated with the same column name can initially have a common edge weight (described below) prior to user feedback, as described further herein at least in relation to FIG. 6.

The edge generator 308 can generate edges between compared nodes and can further generate edge weights for each comparison. The edge weight can be based on (e.g., be proportionally inverse to) the distance metric (e.g., cosine distance) between the semantic vectors associated with the nodes, as illustrated further herein at least in relation to FIGS. 5 and 6. For example, a higher edge weight can indicate that two nodes coupled to that edge are more similar to one another (e.g., the associated semantic vectors have a smaller cosine similarity value) than two nodes associated with a lower edge weight. Similarly stated, an edge weight can represent a confidence metric for whether a first column name (or word from the first column name) is associated with a second column name (or a word from the second column name). An illustration of steps implemented by the graph generator 314 to generate a graph data structure is shown below:

```
Input: All the source column names and target column names obtained from a table name
filter
Output: Mapping Graph
i.      embeddings := pretrained sentence transformer model(source and target column names
        from input)
ii.     source_target_mapping := dictionary( )
iii.    for source column in source column names do:
iv.         for target column in target column names do:
v.              calculate cosine similarity scores from embeddings
vi.         get top three target columns having highest cosine similarity score
vii.        source_target_mapping[source column] := list(top three target column names)
viii.
ix.     Mapping Graph := empty graph { }
x.      for source column in source column names do:
xi.         for target column in source_target_mapping[source column] do:
xii.            for source word in source column do:
xiii.               for target word in target column do:
xiv.                    Mapping Graph := put source word and target word as two vertices
xv.                     Mapping Graph := put the cosine similarity score as the edge value
xvi.        return Mapping Graph
```

In some implementations, the column mapper application 312 can be configured to process table and/or column names and not, for example, data stored within columns (referred to herein as "column data"). As a result, the column mapper application 312 can compare columns from different tables and/or databases without accessing column data that can include, for example, personally identifiable information (PII), confidential data, sensitive data (e.g., internal business data), and/or the like. Alternatively, in some implementations, the column mapper application 312 can have access to at least some column data (e.g., if a user having sufficient permission to view that column data grants access to the column mapper application 312). In some implementations, the column mapper application 312 can be further config-ured to identify predetermined words (e.g., date, time, email, etc.) within a column name and/or table name using regular expression (regex). In response to identifying a predetermined word using regex in a column from a source database and a column from a target database, the column mapper application 312 can define a relationship between the columns (e.g., using an edge having an edge weight that indicates high confidence of the relationship, as described further herein). The column mapper application 312 can define this relationship without generating and comparing semantic vectors via a machine learning model, reducing computational resource use as a result. An illustration of steps implemented by the graph generator 314 to generate a graph data structure based on column data is shown below:

```
Input: Source column names and target column names obtained from a table name filter,
predefined categories (such as: date, time, SSN, credit card, email, phone number, country
code, country names, state code, currency, etc.) with regular expressions.
Output: Mapping Graph
i.      embeddings := pretrained sentence transformer model(source and target column
        names from input)
ii.     source_target_mapping := dictionary( )
iii.    for source column in source column names do:
iv.         for target column in target column names do:
v.              calculate cosine similarity scores from embeddings
vi.             for category in the given predefined categories do:
vii.                match the category's regular expressions with top n data points of source
                    and target columns.
viii.               if regular expression matches:
ix.                     if source column not in source_target_mapping:
x.                          source_target_mapping[source column] := list(matched target column)
xi.                     else:
xii.                        source_target_mapping[source column].append(matched target column)
xiii.               end for
xiv.            end for
xv.         get top three target columns having highest cosine similarity score from
            embeddings
xvi.        if source column not in source_target_mapping:
xvii.           source_target_mapping[source column] := list(top three target column names)
xviii.      else:
xix.            source_target_mapping[source column].append(top three target column
                names)
xx.
xxi.    Mapping Graph := empty graph { }
```

| | |
|---|---|
| xxii. | for source column in source column names do: |
| xxiii. | for target column in source_target_mapping[source column] do: |
| xxiv. | for source word in source column do: |
| xxv. | for target word in target column do: |
| xxvi. | Mapping Graph := put source word and target word as two vertices |
| xxvii. | Mapping Graph := put the cosine similarity score as the edge value |
| xxviii. | return Mapping Graph |

Figure 6:
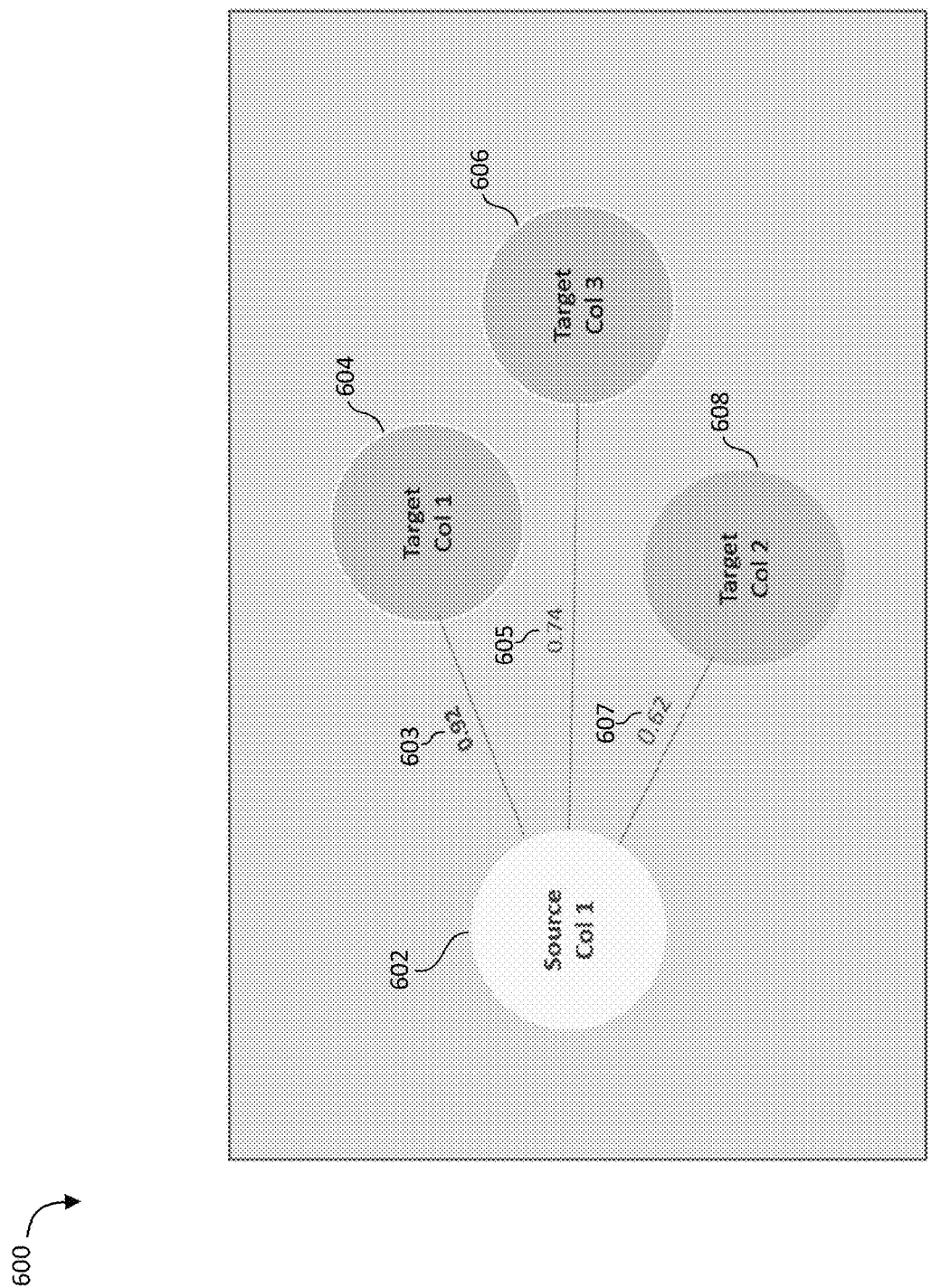
FIG. 6 shows a representation of nodes and edges having edge weights, from a graph data structure that is generated by a column mapper application, according to an embodiment.

The feedback collector 316 can be configured to cause display of a portion of the graph generated by the graph generator 314 and receive user feedback, via the user interface 322. In response to receiving the user feedback, the feedback collector 316 can modify (e.g., increase and/or decrease) the edge weights. More specifically, as illustrated in FIG. 6, a node from the first database 332 and a plurality of nodes from the second database 334 can be displayed via the user interface 322. In some implementations, a predetermined number of nodes from the second database 334 (e.g., three nodes, as shown in FIG. 6) can be automatically (e.g., without human intervention) displayed based on those nodes having the highest edge weights from remaining nodes coupled to the node from the first database 332. As a result, the remaining nodes coupled to the node from the first database 332 are not displayed. Once displayed, a user can accept and/or reject edges via the user interface 322 to confirm a similarity between the node from the first database 332 and a node from the predetermined number of nodes from the second database 334. The feedback collector 316 can increase an edge weight in response to a user accepting a node and decrease an edge weight in response to a user rejecting a node. More specifically, the feedback collector 316 can increment a multiplier of the edge weight each time a user confirms an association (as indicated by the edge and/or edge weight) between two nodes and can decrement the multiplier each time a user rejects the association. In response to (1) an edge weight being above a predetermined threshold value and/or (2) a user (or group of users) selecting a node at least a predetermined number of times, the feedback collector 316 can discontinue that selected node from being displayed and determine that the associated column name (or a word from that column name) maps to the column name (or column name word) for the node from the first database 332.

In some implementations, the feedback collector 316 can determine a linkage metric value between at least two tables based on the number of columns that are mapped between the at least two tables. For example, two tables each having a great number of columns that are mapped to each other can have a larger linkage metric value than two tables each having fewer columns mapped to each other. Thus, the linkage metric can indicate a similarity between two or more tables. An example of a linkage metric is shown below:

Table Linkage Score =

$$\frac{\text{number of mapped columns between source and target table}}{\text{Union}}$$
(number of columns of source table mapped to some target columns, number of columns of target table mapped to some source columns)

In response to the feedback collector 316 determining a map between a column from the first database 332 and a column from the second database 334, the column mapper application 312 can further define a link between those columns. The link can include, for example, an automatic copy routine that automatically updates data stored within the column of the first database 332 at the column of the second database 334, and vice versa. For example, in response to a request to store data at a memory location of the first database 332, the link can cause a copy of the data to be automatically stored at a memory location of the second database 334. More specifically, after columns have been mapped, data transfer from the source database to the target database can be automatically and/or manually triggered (e.g., based on a user-defined configuration). The data transfer can be facilitated by scripts, APIs, database connectors, direct SQL queries, etc.

In some implementations, mapped column indications can be stored in a memory that is functionally and/or structurally similar to the memory 210 of FIG. 2. The mapped column indications can then be used as in data federation to build a virtual database with an abstraction layer over multiple databases, permitting queries to be run across different data sources as if they were a single database. This data federation can facilitate consolidated reports and/or visualizations generated from the abstraction layer based on mapped schema information. In some implementations, after a mapping between two databases, unmapped columns between the two databases can be automatically deleted, merged, and/or imported from the source database to the target database.

FIG. 4 shows a swim lane diagram of interactions 431-436 facilitated by a column mapper application, according to an embodiment. The column mapper application can be functionally and/or structurally similar to the column mapper application 112 of FIG. 1, the column mapper application 212 of FIG. 2, and/or the column mapper application 312 of FIG. 3. The column mapper application includes components that are functionally and/or structurally similar to the components 300 of FIG. 3. More specifically, the components include a table name filter 402 (e.g., that is functionally and/or structurally similar to the table name filter 302 of FIG. 3), a column name embedder 404 (e.g., that is functionally and/or structurally similar to the column name embedder 304 of FIG. 3), a graph generator 414 (e.g., that is functionally and/or structurally similar to the graph generator 214 of FIG. 2 and/or the graph generator 314 of FIG. 3), a feedback collector 416 (e.g., that is functionally and/or structurally similar to the feedback collector 216 of FIG. 2 and/or the feedback collector 316 of FIG. 3), and a user interface 422 (e.g., that is functionally and/or structurally similar to the user interface 122 of FIG. 1 and/or the user interface 322 of FIG. 3).

The table name filter 402 receives table name data associated with source and target databases and generates table name embedded data (e.g., semantic vectors) by iteratively providing each table name from the table name data as input to a first machine learning model (e.g., a transformer-based model and/or the like). At 431, a subset of table metadata (e.g., that includes column name data) that is associated with a subset of the tables associated with the table name data is sent to the column name embedder 404. The subset of tables can be determined based on a comparison between the generated table name embedded data and embedded data that is associated with (e.g., as determined by a distance metric) a user-defined subject.

The column name embedder 404 can be configured to generate column name embedded data by iteratively providing column name data from the subset of table metadata as input to a second machine learning model (e.g., a transformer-based model and/or the like). At 432, the column name embedded data can be provided to the graph generator 414 to generate nodes for each column name (or column name word) from the subset of table metadata. The graph generator 414 can further generate edges between nodes associated with different databases, and each edge can have an edge weight that can be determined based on a comparison between column name embedded data associated with the two nodes coupled to that edge.

At 433, the generated graph data structure can be provided to the feedback collector 416, which can be configured to select a source node (e.g., associated with a first database) and a subset of target nodes (e.g., associated with a second database different from the first database) from the graph data structure, where the subset of target nodes are coupled to the source node by edges having edge weights determined by the graph generator 414. This subset of target nodes can be selected based on the edge weights being higher than edge weight associated with remaining target nodes that are coupled to the source node. At 434, the source node and the subset of target nodes, in addition to the associated edge weights, can be displayed via the user interface 422. At 435, a user can provide user input (e.g., a selection of a target node, a rejection of a target node, a manual entry of a column that maps to a source mode (as described further herein), etc.). In response to receiving the user input, at 436, the feedback collector 416 can update (or cause the graph generator 414 to update) an edge weight associated with a node that involved the user input.

More specifically, at 436, the feedback collector 416 can update an edge weight based on a node pair that is accepted by a user at least once (e.g., repeatedly). In a first epoch, the feedback collector 416 (or an edge weight updater, not shown in FIG. 4) can store the number of times a word-pair is included in acceptance selections and/or in rejection selections. For each word-pair, if the number of acceptance selections is higher than the number of rejection selections, the edge weight for that word-pair (e.g., for the edge between the associated vertices within the graph) can be increased by a value $\delta$ ($0<\delta<1$). If the number of rejection selections is higher than the number of acceptance selections, the edge weight for that word-pair can be penalized by a value $\delta$. For repeated rejections, the feedback collector 416 (or the edge weight updater) can apply the penalization adaptively as $n\delta$, where n is the difference between the number of rejection selections and the number of acceptance selections for that word-pair. Adaptively reduced edge weights for these word-pairs that are below a lower threshold $\theta L$ can cause the user interface 422 to exclude those word pairs from being displayed to the user.

During future epochs (e.g., after the first epoch described above), the user interface 422 (or a column mapper system that implements the user interface 422) can be configured to show a reduced number of columns that have been mapped based on the domain knowledge of users (e.g., human experts). As compared to the mapped columns displayed during the first epoch, a reduced number of columns (e.g., columns having names associated with word-pair edge weights above a higher threshold $\theta H$) are shown, improving mapping quality and reducing compute resource usage.

Figure 5:
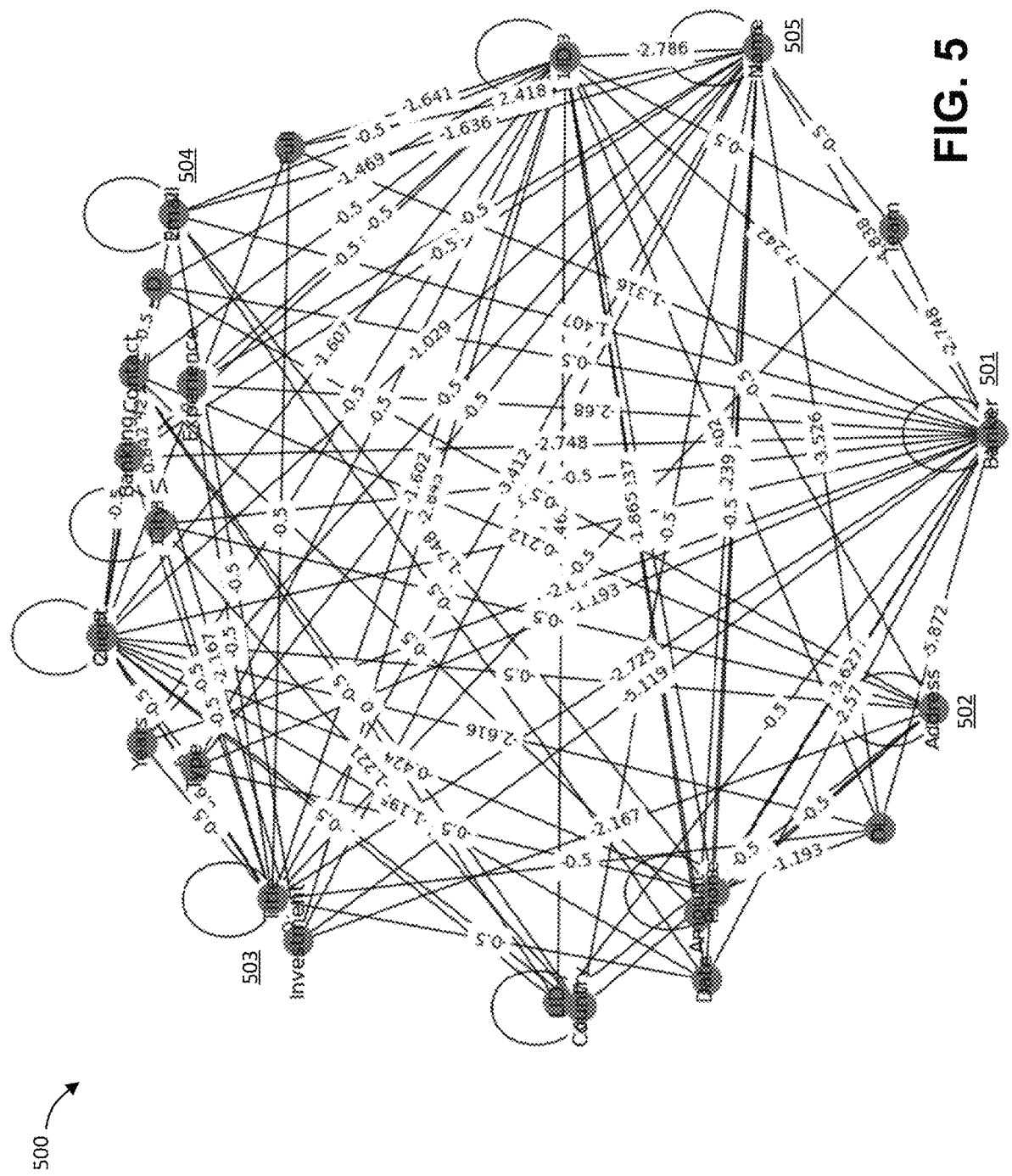
FIG. 5 shows a representation of a graph data structure generated by a column mapper application, according to an embodiment.

FIG. 5 shows a representation of a graph data structure 500 generated by a column mapper application, according to an embodiment. The graph data structure 500 can be generated by a graph generator that is functionally and/or structurally similar to the graph generator 214 of FIG. 2, the graph generator 314 of FIG. 3, and/or the graph generator 414 of FIG. 4. Each node from the graph data structure 500 can represent a column name (or a word from a column name) from a table of a database from a plurality of databases (e.g., similar to the first and second databases 332, 334). Edges between nodes can represent an estimated similarity between column names (or words from column names) In some instances, as shown FIG. 5, the graph data structure 500 can exclude an edge between two nodes (e.g., between the "Banker" node 501 and the "Address" node 502), which can indicate that the cosine distance between the semantic vectors associated with the two nodes is above a predetermined threshold and that the semantic vectors (and the nodes) are, therefore, dissimilar. Alternatively or in addition, the edge between the two nodes can be removed in response to a user(s) rejecting the association between the nodes at least a predetermined number of times. In some instances, as shown in FIG. 5, the graph data structure 500 can include a cyclic edge (e.g., at each of the "Title" node 503, "Email" node 504, "Name" node 505, etc.). The cyclic edge can indicate that the associated column name (or word from the column name) appears in more than one table (e.g., from the same database and/or from different databases). Alternatively or in addition, an edge can be excluded between two nodes if the two nodes are from the same table and/or database. While not shown in FIG. 5, in some instances, the graph data structure 500 can include thousands of nodes, tens of thousands of nodes, etc., that represent columns from large databases.

FIG. 6 shows a representation of nodes and edges having edge weights, from a portion 600 of a graph data structure that is generated by a column mapper application, according to an embodiment. The portion 600 of the graph data structure can be from a graph data structure that is functionally and/or structurally similar to the graph data structure 500 of FIG. 5. The portion 600 of the graph data structure can be displayed via a user interface that is functionally and/or structurally similar to the user interface 122 of FIG. 1 and/or the user interface 322 of FIG. 3. The portion 600 of the graph data structure includes a source node 602 (e.g., that is from a database that is functionally and/or structurally similar to the first database 332 of FIG. 3) and target nodes 604, 606, and 608 (e.g., that are from a database that is functionally and/or structurally similar to the second database 334 of FIG. 3). The target nodes 604, 606 and 608 can be displayed based on the target nodes 604, 606 and 608 having higher edge weights 603, 605, and 607 (respectively) than (1) remaining nodes coupled to the source node 602 within the graph data structure (which are not shown) or (2) remaining nodes coupled to the source node 602 that are yet to be confirmed as mapping to the source node 602. As indicated by the edge weights 603, 605 and 607, the column name (or word from the column name) associated with the target node 604 can be more similar to the source node 602 than the column names (or words from a column name(s)) associated with the target nodes 606 and 608. Similarly, the column name (or word from the column name) associated with the target node 606 can be more similar to the source node 602 than the column name (or word from a column name) associated with the target node 608.

In some instances, a target node (e.g., the target node 604, 606, and/or 608) can be associated with a word from a plurality of words of a column name. That word associated with the target node can be selected from the plurality of words for display based on that word having a higher similarity to the word associated with the source node. In some instances, a word can be included in more than one column name (e.g., in both a column from a source database and a column from a target database). A cyclic edge within a graph data structure (e.g., as shown in FIG. 5) can represent a word included in more than one column name. In these instances, a single node representing the word can be displayed, and the displayed edge weight can be the largest edge weight from a plurality of edge weights associated with the word.

Figure 7:
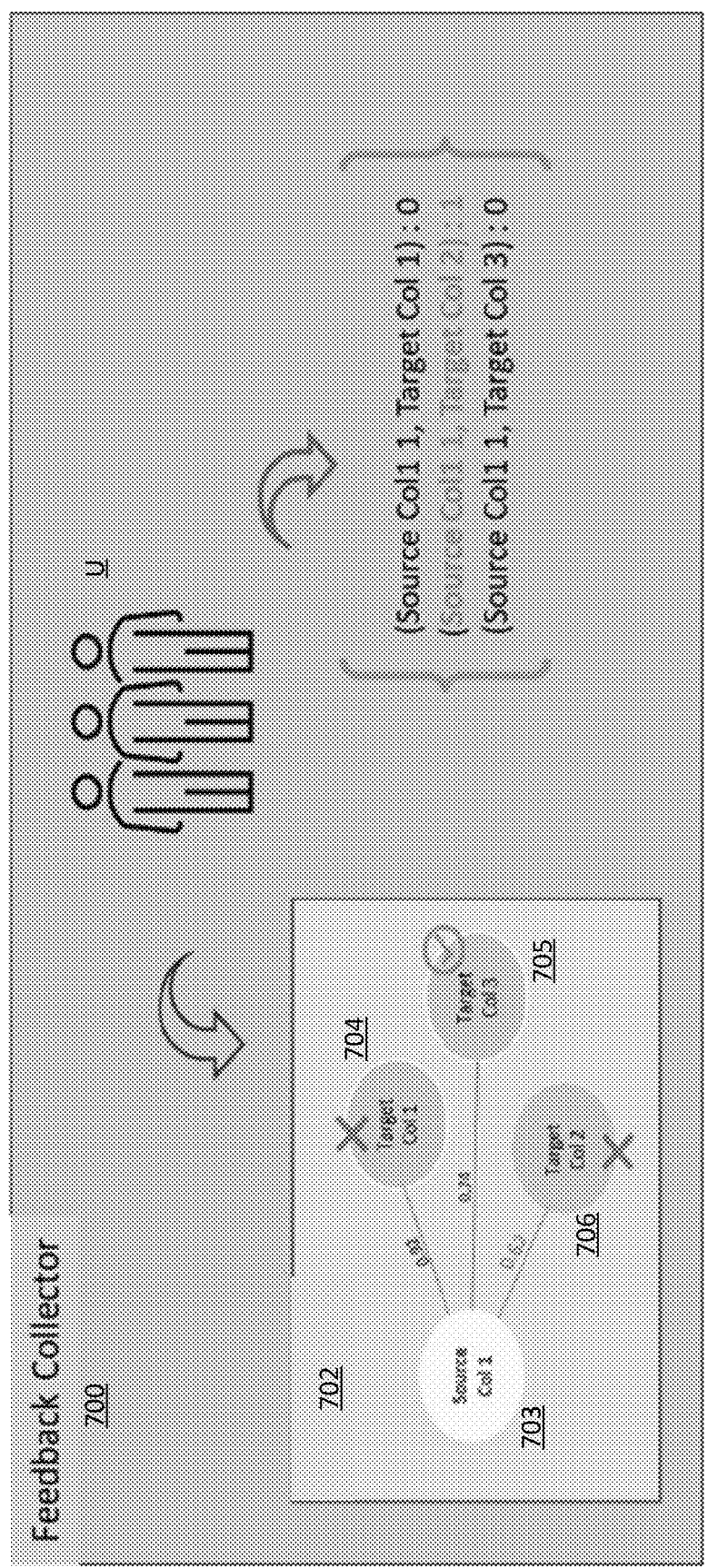
FIG. 7 shows a schematic diagram of a feedback collector implemented by a column, mapper system, according to an embodiment.

FIG. 7 shows a schematic diagram of a feedback collector 700 implemented by a column, mapper system, according to an embodiment. The column mapping system can be functionally and/or structurally similar to the column mapper system 100 of FIG. 1, and the feedback collector 700 can be functionally and/or structurally similar to the feedback collector 216 of FIG. 2, the feedback collector 316 of FIG. 3, and/or the feedback collector 416 of FIG. 4. User(s) U can interface with the feedback collector 700 via a user interface that is functionally and/or structurally similar to the user interface 122 of FIG. 1 and/or the user interface 322 of FIG. 3. The feedback collector 700 can cause modification to edge weights within the graph portion 702, which can be functionally and/or structurally similar to the portion 600 of the graph data structure shown in FIG. 6. For example, as shown in FIG. 7, the user(s) U can select the target node 705 as being a closer match with the source node 703 than the target nodes 704 and 706, despite the target node 705 having a lower initial edge weight than the initial weights for the target nodes 704 and 706 (e.g., as determined by an edge generator that is functionally and/or structurally similar to the edge generator 308 of FIG. 3). To select the target node 705, the user(s) U can select, via the user interface, a positive indicator associated with the target node 705. In some instances, to reject the target nodes 704 and 706, the user(s) U can not select positive indicators associated with, respectively, the target nodes 704 and 706. Alternatively or in addition, to reject the target nodes 704 and 706, the user(s) U can select negative indicators associated with, respectively, the target nodes 704 and 706.

In response to the user(s) U selecting the target node 705, the feedback collector 700 can increment a selection count associated with the target node 705. Once the selection count for the target node 705 is at least a predetermined number (e.g., one, two, three, etc.), the feedback collector 700 can prevent the target node 705 from being displayed with the source node 703 to users for further selection, and the mapping between the source node 703 and the target node 705 can be confirmed. While not shown in FIG. 7, in some implementations, the feedback collector 700 can permit the user(s) U to reject a node pairing if the user(s) U determines that the source and target nodes of that pair are unrelated. In response to the user(s) U rejecting the node pair, the feedback collector 700 can increment a rejection count (or decrement a selection count) associated with the target node of the node pair. Once the rejection count for the target node is at least a predetermined number (or a selection count is at most a predetermined minimum value), the feedback collector 700 can prevent that target node from being displayed with the source node to the user(s) U for further selection, and the lack (or insufficient extent) of relatedness between the source node 703 and the target node 705 can be confirmed. In some instances, the user(s) U can reject all three target nodes (or another predetermined number of target nodes selected for display). In response, the feedback collector 700 can be configured to prompt the user(s) U to manually enter a column from a target database that maps to the displayed source node 703.

Figure 8B:
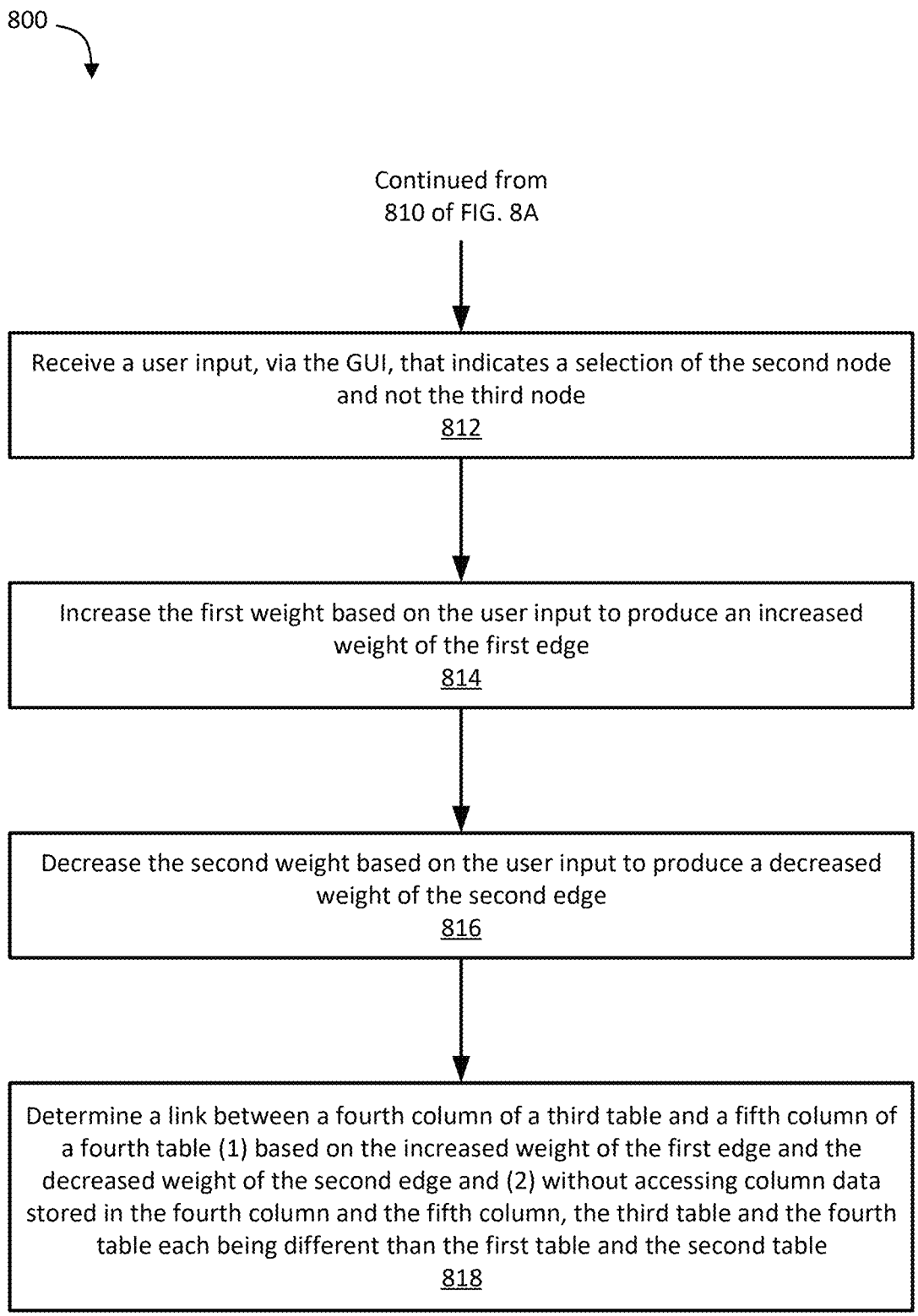

FIGS. 8A-B show flow diagrams illustrating a method 800 implemented by a column mapper application to determine a link between columns of tables, according to an embodiment. The method 800 can be implemented by a column mapper system described herein (e.g., the column mapper system 100 of FIG. 1). Portions of the method 800 can be implemented using a processor (e.g., the processor 220 of FIG. 2) of any suitable compute device (e.g., the compute device 201 of FIG. 2 and/or the compute devices 110 and/or 120 and/or the database server(s) 130 of FIG. 1).

At 802, the method 800 includes receiving (1) first column name data associated with a first column, (2) second column name data associated with a second column, and (3) not remaining data from the first column and the second column, the first column name data being associated with a first table, and the second column name data being associated with a second table that is different from the first table. The first column name data is provided as input to a machine learning model at 804 to produce a first semantic vector. Also at 804, the second column name data is provided as input to the machine learning model to produce a second semantic vector. At 806, the first column name data is added to a first node of a graph data structure, and the second column name data is added to a second node of the graph data structure. A first edge is generated between the first node and the second node at 808, the first edge having a first weight that is determined based on a distance metric between the first semantic vector and the second semantic vector. The method 800 at 810 includes causing display, via a graphical user interface (GUI) executed at a compute device, of (1) the first node, (2) the second node, (3) the first edge, (4) a third node associated with third column name data that is different from the first column name data, and (5) a second edge between the first node and the third node, the second edge having a second weight that is determined based on the first semantic vector and a third semantic vector associated with the third node. A user input that indicates a selection of the second node and not the third node is received via the GUI at 812, and the first weight is increased at 814 based on the user input to produce an increased weight of the first edge. The second weight is decreased at 816 based on the user input to produce a decreased weight of the second edge. A link is defined between a fourth column of a third table and a fifth column of a fourth table at 818 (1) based on the increased weight of the first edge and the decreased weight of the second edge and (2) without accessing column data stored in the fourth column and the fifth column, the third table and the fourth table each being different than the first table and the second table.

FIG. 9 shows a flow diagram illustrating a method 900 implemented by a column mapper application to identify a column based on column name data and without accessing column data. The method 900 can be implemented by a column mapper system described herein (e.g., the column mapper system 100 of FIG. 1). Portions of the method 900 can be implemented using a processor (e.g., the processor 220 of FIG. 2) of any suitable compute device (e.g., the compute device 201 of FIG. 2 and/or the compute devices 110 and/or 120 and/or the database server(s) 130 of FIG. 1).

The method 900 at 902 includes receiving column data that is (a) associated with a column of a first table and (b) not associated with a column of a second table. Also at 902, the method 900 includes receiving first column name data associated with the column of the first table. A column of a second table is identified is identified at 904 (1) based on (a) the first column name data, (b) second column name data associated with the column of the second table, and (c) a map between the column of the first table and the column of the second table. The column of the second table is identified without accessing the column data. The map is generated based on a graph that includes (1) a first node that is associated with the first column name data, (2) a second node that is associated with the second column name data, and (3) an edge between the first node and the second node. The edge has an initial weight value that is determined based on (a) a first semantic vector associated with the first column name data and (b) a second semantic vector associated with the second column name data. The map is generated based further on a user-defined selection of the second node that causes the initial weight value to be greater than a predefined threshold. In response to identifying the column of the second table, the column data is stored in the column of the second table.

FIG. 10 shows a flow diagram illustrating a method 1000 implemented by a column mapper application to automatically cause input data to be stored at a memory location. The method 1000 can be implemented by a column mapper system described herein (e.g., the column mapper system 100 of FIG. 1). Portions of the method 1000 can be implemented using a processor (e.g., the processor 220 of FIG. 2) of any suitable compute device (e.g., the compute device 201 of FIG. 2 and/or the compute devices 110 and/or 120 and/or the database server(s) 130 of FIG. 1).

The method 1000 at 1002 includes causing display of (1) a first node associated with a name of a column of a first table, (2) a second node associated with a name of a column of a second table, and (3) a third node associated with a name of a column of a third table. A user-defined selection of the second node and not the third node is received at 1004 via a graphical user interface (GUI). A request to store, at a first memory location, input data associated with the column of the first table is received at 1006, and based on the user-defined selection and in response to receiving the request, at 1008, the input data is stored at a second memory location associated with the column of the second table.

According to an embodiment, a non-transitory, processor-readable medium stores instructions that, when executed by a processor, cause the processor to receive (1) first column name data associated with a first column, (2) second column name data associated with a second column, and (3) not remaining data from the first column and the second column, the first column name data being associated with a first table, and the second column name data being associated with a second table that is different from the first table. The first column name data is provided as input to a machine learning model to produce a first semantic vector, and the second column name data is provided as input to the machine learning model to produce a second semantic vector. The first column name data is added to a first node of a graph data structure, and the second column name data is added to a second node of the graph data structure. A first edge is generated between the first node and the second node, the first edge having a first weight that is determined based on a distance metric between the first semantic vector and the second semantic vector. The instructions also cause the processor to cause display, via a graphical user interface (GUI) executed at a compute device, of (1) the first node, (2) the second node, (3) the first edge, (4) a third node associated with third column name data that is different from the first column name data, and (5) a second edge between the first node and the third node, the second edge having a second weight that is determined based on the first semantic vector and a third semantic vector associated with the third node. A user input is received, via the GUI, that indicates a selection of the second node and not the third node, and the first weight is increased based on the user input to produce an increased weight of the first edge. The second weight is decreased based on the user input to produce a decreased weight of the second edge. A link is defined between a fourth column of a third table and a fifth column of a fourth table (1) based on the increased weight of the first edge and the decreased weight of the second edge and (2) without accessing column data stored in the fourth column and the fifth column, the third table and the fourth table each being different than the first table and the second table.

In some implementations, the machine learning model is a first machine learning model, and the non-transitory, processor-readable medium further stores instructions to cause the processor to receive table metadata that includes a plurality of table names and excludes remaining table data, each table name from the plurality of table names being associated with a table different from remaining tables from a plurality of tables. Each table name from the plurality of table names is provided as input to a second machine learning model to produce a plurality of semantic vectors that is associated with the plurality of table names. A subset of tables from the plurality of tables is identified based on the plurality of semantic vectors, the subset of tables including the first table and the second table. In some implementations, the user input is a first user input, the selection of the second node is a first selection of the second node, and the non-transitory, processor-readable medium further stores instructions to cause the processor to receive a second user input, via the GUI, that indicates a second selection of the second node and not the third node. In response to receiving the second user input, the second node is discontinued from being displayed via the GUI.

In some implementations, the user input is a first user input, the third column name data is associated with a third column and the second table, and the non-transitory, processor-readable medium further stores instructions to cause the processor to receive a second user input, via the GUI, that indicates a selection of the third node and determine a linkage metric value based on the selection of the second node and the selection of the third node, the linkage metric value being associated with the first table and the second table. Display of the linkage metric value is caused via the GUI. In some implementations, the machine learning model is a transformer model. In some implementations, the non-transitory, processor-readable medium further stores instructions to cause the processor to receive data to be stored at a first memory location associated with the fourth column and cause the data to be stored at the first memory location. The instructions further cause the processor to automatically cause the data to be stored at a second memory location based on the link and not the data, the second memory location being associated with the fifth column.

According to an embodiment, a non-transitory, processor-readable medium stores instructions that, when executed by a processor, cause the processor to receive column data that is (a) associated with a column of a first table and (b) not associated with a column of a second table. The instructions further cause the processor to receive first column name data associated with the column of the first table. A column of a second table is identified (1) based on (a) the first column name data, (b) second column name data associated with the column of the second table, and (c) a map between the column of the first table and the column of the second table. The column of the second table is identified without accessing the column data. The map is generated based on a graph that includes (1) a first node that is associated with the first column name data, (2) a second node that is associated with the second column name data, and (3) an edge between the first node and the second node. The edge has an initial weight value that is determined based on (a) a first semantic vector associated with the first column name data and (b) a second semantic vector associated with the second column name data. The map is generated based further on a user-defined selection of the second node that causes the initial weight value to be greater than a predefined threshold. In response to identifying the column of the second table, the column data is stored in the column of the second table.

In some implementations, the first semantic vector is generated by providing the first column name data as input to a machine learning model, and the second semantic vector is generated by providing the second column name data as input to the machine learning model. In some implementations, the machine learning model is a transformer model. In some implementations, the user-defined selection is received via a graphical user interface (GUI) that depicts the first node and the second node. In some implementations, the non-transitory, processor-readable medium further stores instructions to cause the processor to discontinue the second node from being displayed via the GUI in response to receiving a predetermined number of user-defined selections that include the user-defined selection. In some implementations, the map is generated based further on a subset of tables that includes the first table and the second table, the subset of tables being identified from a plurality of tables based on a subset of semantic vectors defining a cluster within a plurality of semantic vectors, the subset of semantic vectors being associated with the subset of tables, and the plurality of semantic vectors being associated with the plurality of tables.

In some implementations, the plurality of semantic vectors is generated by iteratively providing each table name associated with each table from the plurality of tables as input to a machine learning model. In some implementations, the non-transitory, processor-readable medium further stores instructions to cause the processor to determine a linkage metric value based on a number of column pairs that are associated with the map, the column pairs including a column pair that is associated with the column of the first table and the column of the second table. In response to determining the linkage metric value, the linkage metric value is displayed via a graphical user interface (GUI).

According to an embodiment, a non-transitory, processor-readable medium storing instructions that, when executed by a processor, cause the processor to cause display of (1) a first node associated with a name of a column of a first table, (2) a second node associated with a name of a column of a second table, and (3) a third node associated with a name of a column of a third table. A user-defined selection of the second node and not the third node is received via a graphical user interface (GUI). A request to store, at a first memory location, input data associated with the column of the first table is received and based on the user-defined selection and in response to receiving the request, the input data is stored at a second memory location associated with the column of the second table.

In some implementations, the non-transitory, processor-readable medium further stores instructions to cause the processor to provide the name of the column of the first table as input to a machine learning model to produce a first semantic vector. The name of the column of the third table is provided as input to the machine learning model to produce a second semantic vector, and a similarity value is determined based on (1) the first semantic vector and (2) the second semantic vector. In response to receiving the user-defined selection, the similarity value is decreased to produce a decreased similarity value, and a node pair that includes the first node and the third node is no longer be displayed via the GUI in response to the decreased similarity value being below a predefined threshold. In some implementations, the instructions to cause the processor to decrease the similarity value include instructions to cause the processor to decrement a multiplier associated with the similarity value based on the user-defined selection excluding the third node. In some implementations, the machine learning model is a word2vec model. In some implementations, the first table is associated with a first database, the second table is associated with a second database different from the first database, the third table is associated with a third database different from the first database, the name of the column of the first table is different from (1) the name of the column of the second table and (2) the name of the column of the third table, and the name of the column of the second table is different from the name of the column of the third table.

In some implementations, the name of the column of the first table includes a first word and a second word different from the first word, and the non-transitory, processor-readable medium further stores instructions to cause the processor to cause display of a fourth node associated with the first word, the first node being associated with the second word, and the fourth node being excluded from the user-defined selection. An association between a column of a fourth table and a column of a fifth table is determined based on the first word and not the second word.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium and/or a machine-readable medium) having instructions or computer code thereon for performing various computer-implemented operations. The computer-readable medium (or processor-readable medium, machine-readable medium, etc.) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A non-transitory, processor-readable medium storing instructions that, when executed by a processor, cause the processor to:
receive (1) first column name data associated with a first column, (2) second column name data associated with a second column, and (3) not remaining data from the first column and the second column, the first column name data being associated with a first table, and the second column name data being associated with a second table that is different from the first table;
provide the first column name data as input to a machine learning model to produce a first semantic vector;
provide the second column name data as input to the machine learning model to produce a second semantic vector;
add (1) the first column name data to a first node of a graph data structure and (2) the second column name data to a second node of the graph data structure;
generate a first edge between the first node and the second node, the first edge having a first weight that is determined based on a distance metric between the first semantic vector and the second semantic vector;
cause display, via a graphical user interface (GUI) executed at a compute device, of (1) the first node, (2) the second node, (3) the first edge, (4) a third node associated with third column name data that is different from the first column name data, and (5) a second edge between the first node and the third node, the second edge having a second weight that is determined based on the first semantic vector and a third semantic vector associated with the third node;
receive a user input, via the GUI, that indicates a selection of the second node and not the third node;
increase the first weight based on the user input, to produce an increased weight of the first edge;
decrease the second weight based on the user input, to produce a decreased weight of the second edge; and
determine a link between a fourth column of a third table and a fifth column of a fourth table (1) based on the increased weight of the first edge and the decreased weight of the second edge and (2) without accessing column data stored in the fourth column and the fifth column, the third table and the fourth table each being different than the first table and the second table.

2. The non-transitory, processor-readable medium of claim 1, wherein the machine learning model is a first machine learning model, the non-transitory, processor-readable medium further storing instructions to cause the processor to:
receive table metadata that includes a plurality of table names and excludes remaining table data, each table name from the plurality of table names being associated with a table different from remaining tables from a plurality of tables;
provide each table name from the plurality of table names as input to a second machine learning model to produce a plurality of semantic vectors that is associated with the plurality of table names; and
identify a subset of tables from the plurality of tables based on the plurality of semantic vectors, the subset of tables including the first table and the second table.

3. The non-transitory, processor-readable medium of claim 1, wherein the user input is a first user input, the selection of the second node is a first selection of the second node, and the non-transitory, processor-readable medium further storing instructions to cause the processor to:
receive a second user input, via the GUI, that indicates a second selection of the second node and not the third node; and
in response to receiving the second user input, discontinue the second node from being displayed via the GUI.

4. The non-transitory, processor-readable medium of claim 1, wherein:
the user input is a first user input;
the third column name data is associated with a third column and the second table; and
the non-transitory, processor-readable medium further stores instructions to cause the processor to:
receive a second user input, via the GUI, that indicates a selection of the third node,
determine a linkage metric value based on the selection of the second node and the selection of the third node, the linkage metric value being associated with the first table and the second table, and
cause display of the linkage metric value via the GUI.

5. The non-transitory, processor-readable medium of claim 1, wherein the machine learning model is a transformer model.

6. The non-transitory, processor-readable medium of claim 1, further storing instructions to cause the processor to:
receive data to be stored at a first memory location associated with the fourth column;
cause the data to be stored at the first memory location; and
automatically cause the data to be stored at a second memory location based on the link and not the data, the second memory location being associated with the fifth column.

7. A non-transitory, processor-readable medium storing instructions that, when executed by a processor, cause the processor to:
receive (1) column data that is (a) associated with a column of a first table and (b) not associated with a column of a second table and (2) first column name data associated with the column of the first table; and
identify a column of a second table (1) based on (a) the first column name data, (b) second column name data associated with the column of the second table, and (c) a map between the column of the first table and the column of the second table, and (2) without accessing the column data, the map being generated based on:
a graph that includes (1) a first node that is associated with the first column name data, (2) a second node that is associated with the second column name data, and (3) an edge between the first node and the second node, the edge having a first weight value that is determined based on (a) a first semantic vector associated with the first column name data and (b) a second semantic vector associated with the second column name data, and
a user-defined selection of the second node that causes an increase to the first weight value to produce a second weight value that is greater than a predefined threshold;

in response to identifying the column of the second table, cause the column data to be stored in the column of the second table;

determine a linkage metric value based on a number of column pairs that are associated with the map, the column pairs including a column pair that is associated with the column of the first table and the column of the second table; and in response to determining the linkage metric value, cause display of the linkage metric value via a graphical user interface (GUI).

8. The non-transitory, processor-readable medium of claim 7, wherein:

the first semantic vector is generated by providing the first column name data as input to a machine learning model; and the second semantic vector is generated by providing the second column name data as input to the machine learning model.

9. The non-transitory, processor-readable medium of claim 8, wherein the machine learning model is a transformer model.

10. The non-transitory, processor-readable medium of claim 7, wherein the user-defined selection is received via a graphical user interface (GUI) that depicts the first node and the second node.

11. The non-transitory, processor-readable medium of claim 10, further storing instructions to cause the processor to discontinue the second node from being displayed via the GUI in response to receiving a predetermined number of user-defined selections that include the user-defined selection.

12. The non-transitory, processor-readable medium of claim 7, wherein:

the map is generated based further on a subset of tables that includes the first table and the second table, the subset of tables being identified from a plurality of tables based on a subset of semantic vectors defining a cluster within a plurality of semantic vectors, the subset of semantic vectors being associated with the subset of tables, and the plurality of semantic vectors being associated with the plurality of tables.

13. The non-transitory, processor-readable medium of claim 12, wherein the plurality of semantic vectors is generated by iteratively providing each table name associated with each table from the plurality of tables as input to a machine learning model.

14. A non-transitory, processor-readable medium storing instructions that, when executed by a processor, cause the processor to:

cause display of (1) a first node associated with a name of a column of a first table, (2) a second node associated with a name of a column of a second table, and (3) a third node associated with a name of a column of a third table;

receive, via a graphical user interface (GUI), a user-defined selection of the second node and not the third node;

receive a request to store, at a first memory location, input data associated with the column of the first table;

based on the user-defined selection and in response to receiving the request, automatically cause the input data to be stored at a second memory location associated with the column of the second table;

provide the name of the column of the first table as input to a machine learning model to produce a first semantic vector;

provide the name of the column of the third table as input to the machine learning model to produce a second semantic vector;

determine a similarity value based on (1) the first semantic vector and (2) the second semantic vector;

in response to receiving the user-defined selection, decrease the similarity value to cause the processor to decrement a multiplier associated with the similarity value based on the user-defined selection excluding the third node, to produce a decreased similarity value; and cause a node pair that includes the first node and the third node to no longer be displayed via the GUI in response to the decreased similarity value being below a predefined threshold.

15. The non-transitory, processor-readable medium of claim 14, wherein the machine learning model is a word2vec model.

16. The non-transitory, processor-readable medium of claim 14, wherein:

the first table is associated with a first database;

the second table is associated with a second database different from the first database;

the third table is associated with a third database different from the first database;

the name of the column of the first table is different from (1) the name of the column of the second table and (2) the name of the column of the third table; and the name of the column of the second table is different from the name of the column of the third table.

17. The non-transitory, processor-readable medium of claim 14, wherein the name of the column of the first table includes a first word and a second word different from the first word, the non-transitory, processor-readable medium further storing instructions to cause the processor to:

cause display of a fourth node associated with the first word, the first node being associated with the second word, and the fourth node being excluded from the user-defined selection; and determine an association between a column of a fourth table and a column of a fifth table based on the first word and not the second word.

* * * * *

UNITED STATES PATENT AND TRADEMARK OFFICE
CERTIFICATE OF CORRECTION

| | |
|---|---|
| PATENT NO. | : 12,298,957 B1 |
| APPLICATION NO. | : 18/953584 |
| DATED | : May 13, 2025 |
| INVENTOR(S) | : Arindam Banerjee et al. |

Page 1 of 1

It is certified that error appears in the above-identified patent and that said Letters Patent is hereby corrected as shown below:

In the Specification

At Column 14, Line number 2, "weights above a higher threshold OH) are shown, improving" should read -- weights above a higher threshold $\theta H$) are shown, improving --

Signed and Sealed this
Twenty-fourth Day of June, 2025

Coke Morgan Stewart
*Acting Director of the United States Patent and Trademark Office*